United States Patent
Oslake et al.

(10) Patent No.: US 9,015,662 B2
(45) Date of Patent: Apr. 21, 2015

(54) SERVICE LEVEL OBJECTIVE FOR CLOUD HOSTED APPLICATIONS

(71) Applicant: Microsoft Corporation, Redmond, WA (US)

(72) Inventors: John M. Oslake, Seattle, WA (US); Subramanian Muralidhar, Bellevue, WA (US); Richard Shawn Bice, Sammamish, WA (US); Jeffrey Robert Currier, Issaquah, WA (US); Narayan Mohanrao Nevrekar, Bellevue, WA (US); Kenneth Van Hyning, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/198,926

(22) Filed: Mar. 6, 2014

(65) Prior Publication Data

US 2014/0189639 A1 Jul. 3, 2014

Related U.S. Application Data

(63) Continuation of application No. 13/441,225, filed on Apr. 6, 2012, now Pat. No. 8,707,254.

(51) Int. Cl.
*G06F 9/44* (2006.01)
*G06F 9/50* (2006.01)

(52) U.S. Cl.
CPC ................ *G06F 8/30* (2013.01); *G06F 9/5072* (2013.01)

(58) Field of Classification Search
None
See application file for complete search history.

(56) References Cited

U.S. PATENT DOCUMENTS

| | | |
|---|---|---|
| 7,137,099 B2 | 11/2006 | Knight et al. |
| 8,140,646 B2 | 3/2012 | Mickens et al. |
| 2006/0188011 A1 | 8/2006 | Goldszmidt |
| 2007/0130325 A1 | 6/2007 | Lesser |
| 2008/0037424 A1 | 2/2008 | Anstey et al. |
| 2008/0195404 A1 | 8/2008 | Chron et al. |
| 2009/0063672 A1 | 3/2009 | Kaminsky et al. |
| 2010/0043004 A1 | 2/2010 | Tambi |
| 2011/0010445 A1 | 1/2011 | Das et al. |
| 2011/0138047 A1 | 6/2011 | Brown et al. |
| 2011/0173626 A1 | 7/2011 | Chi et al. |
| 2013/0268914 A1 | 10/2013 | Oslake et al. |

OTHER PUBLICATIONS

"Review and Summary of Cloud Service Level Agreements", Published on: Aug. 4, 2010, Available at: http://www.ibm.com/developerworks/cloud/library/cl-rev2sla.html?ca=drs-.
Chen, et al., "SLA Decomposition: Translation Service Level Objectives to System Level Thresholds", In Proceedings of Fourth International Conference on Autonomic Computing, Jun. 15, 2007, pp. 10.
Zhang, et al., "Cloud Computing: State-of-the-Art and Research Challenges", In Journal of Internet Services and Applications, vol. 1, Issue 1, Apr. 4, 2010, pp. 7-18.
Notice of Allowance cited in U.S. Appl. No. 13/441,225, mailed Dec. 10, 2013.

*Primary Examiner* — Chuck Kendall
(74) *Attorney, Agent, or Firm* — Kate Drakos; David Andrews; Micky Minhas

(57) ABSTRACT

Embodiments are directed to declaratively managing software applications, dynamically applying configuration changes to a specified software application based on a service level objective (SLO) and to efficiently performing an impact analysis for a specified service level agreement SLO.

23 Claims, 5 Drawing Sheets

SERVICE LEVEL OBJECTIVE FOR CLOUD HOSTED APPLICATIONS

CROSS-REFERENCE TO RELATED APPLICATIONS

This continuation application claims priority to and the benefit of U.S. patent application Ser. No. 13/441,225, entitled "Service Level Objective for Cloud Hosted Applications", which was filed on Apr. 6, 2012, and which is incorporated by reference in its entirety herein.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, internet browsers may allow users to interact with other web servers on the internet (a.k.a. "the cloud"). These web servers may provide various types of web services and applications. In some cases, enterprises, governmental bodies or other entities may provide applications to employees or other users via the cloud. These cloud applications may be highly available to the users, and may be provided to the user after the user provides proper login credentials. Administrators of these cloud applications may, at least in some cases, have a limited amount of control over the provisioning and support of these applications.

BRIEF SUMMARY

Embodiments described herein are directed to declaratively managing software applications using service level objectives (SLOs) subject to role-based administrative boundaries, dynamically applying a SLO to one or more specified software applications, and to efficiently performing impact analysis for one or more specified SLOs or for one or more specified software applications. In one embodiment, a cluster management system receives at least one declarative statement. The semantics of the declarative statement allow a user to express provisioning and/or operational requirements for an application that are independent of implementation details of the server computer system which hosts the application. The cluster management system determines which SLO service dimensions and dimension properties match the provisioning and/or operational requirements specified in the declarative statement. Each SLO defines SLO service dimensions and dimension properties that are intended to be provided during the provisioning and/or the runtime execution of the specified application. The cluster management system then generates an SLO for the specified application based on the determined SLO service dimensions and dimension properties that matched the operational requirements specified in the declarative statement.

In another embodiment, a cluster management system dynamically applies configuration changes to a specified software application based on an SLO. The cluster management system determines that an SLO has been applied to a specified software application. The SLO indicates various SLO service dimensions and dimension properties that are to be provided during the provisioning and/or the runtime execution of the specified application. The cluster management system determines that at least one of the SLO service dimensions and dimension properties that were to be provided during the provisioning and/or the runtime execution of the specified application is currently not being provided, and further determines which configuration changes are to be implemented to satisfy the SLO service dimensions and dimension properties for the specified application. Then, based on the determination of which configuration changes are to be made, the cluster management system applies the determined configuration changes, so that the application is provisioned and/or operates during runtime according to the SLO service dimensions, dimension properties, and dimension settings specified in the SLO.

In yet another embodiment, a cluster management system efficiently performs an impact analysis for a specified service level objective SLO. The cluster management system receives an indication that a specified SLO is to be applied to one or more applications. The SLO indicates SLO service dimensions and dimension properties that are to be applied to the applications. The cluster management system initiates an impact analysis to determine the potential effects to the cluster according to the SLO service dimensions and dimension properties indicated in the specified SLO. The cluster management system then provides the results of the impact analysis to the user. The results indicate the potential effects to the cluster of hosting the specified applications according to the SLO service dimensions and dimension properties indicated in the specified SLO.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
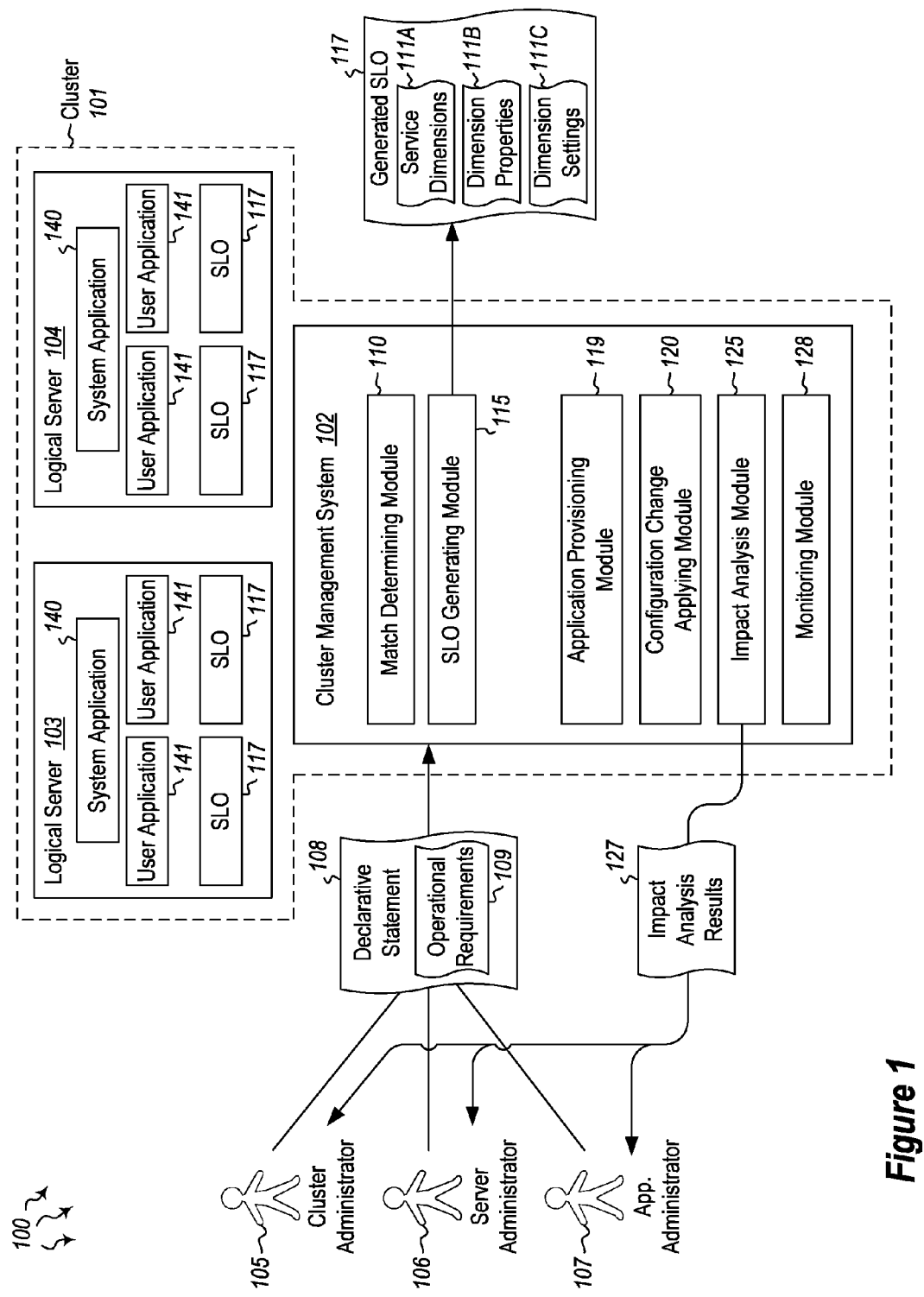
FIG. 1 illustrates a computer architecture in which embodiments of the present invention may operate including declaratively managing software applications.

Embodiments described herein are directed to declaratively managing software applications using service level objectives (SLOs) subject to role-based administrative boundaries, dynamically applying a SLO to one or more specified software applications, and to efficiently performing impact analysis for one or more specified SLOs or for one or more specified software applications. In one embodiment, a cluster management system receives at least one declarative statement. The semantics of the declarative statement allow a user to express provisioning and/or operational requirements for an application that are independent of implementation details of the server computer system which hosts the application. The cluster management system determines which SLO service dimensions and dimension properties match the provisioning and/or operational requirements specified in the declarative statement. Each SLO defines SLO service dimensions and dimension properties that are intended to be provided during the provisioning and/or the runtime execution of the specified application. The cluster management system then generates an SLO for the specified application based on the determined SLO service dimensions and dimension properties that matched the operational requirements specified in the declarative statement.

In another embodiment, a cluster management system dynamically applies configuration changes to a specified software application based on an SLO. The cluster management system determines that an SLO has been applied to a specified software application. The SLO indicates various SLO service dimensions and dimension properties that are to be provided during the provisioning and/or the runtime execution of the specified application. The cluster management system determines that at least one of the SLO service dimensions and dimension properties that were to be provided during the provisioning and/or the runtime execution of the specified application is currently not being provided, and further determines which configuration changes are to be implemented to satisfy the SLO service dimensions and dimension properties for the specified application. Then, based on the determination of which configuration changes are to be made, the cluster management system applies the determined configuration changes, so that the application is provisioned and/or operates during runtime according to the SLO service dimensions, dimension properties, and dimension settings specified in the SLO.

In yet another embodiment, a cluster management system efficiently performs an impact analysis for a specified service level objective SLO. The cluster management system receives an indication that a specified SLO is to be applied to one or more applications. The SLO indicates SLO service dimensions and dimension properties that are to be applied to the applications. The cluster management system initiates an impact analysis to determine the potential effects to the cluster according to the SLO service dimensions and dimension properties indicated in the specified SLO. The cluster management system then provides the results of the impact analysis to the user. The results indicate the potential effects to the cluster of hosting the specified applications according to the SLO service dimensions and dimension properties indicated in the specified SLO.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system.

Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes cluster 101. Cluster 101 may include a plurality of different physical or logical server computer systems, including cluster management system 102 and logical servers 103 and 104. The servers in the cluster 101 may be different types of computing systems including actual, physical servers, virtual (logical) servers or instances of servers, distributed servers (which includes cloud processing, cloud storage, cloud databases, etc.) or other types of computer systems. Thus, the cluster 101 may include a combination of physical and logical servers. Cluster management system 102 may, consequently, be any type of local, distributed, logical or other computing system. In some cases, the cluster management system 102 may be an instance of a cluster management system. As such, many different cluster management instances may be operating in cluster 101 at any given time.

Logical server 103 provides an administrative boundary for a group of applications and group of SLOs belonging to the same cloud service user. Similarly, logical server 104 provides an administrative boundary for a group of applications and group of SLOs that may belong to a different cloud service user. A logical server may be span different physical computer systems, or reside on the same physical computer system. Both the logical computer systems and the physical computer systems may be distributed or local. In some cases, a logical server may be a single server running on a single physical computer system. In some other cases, a logical server may be running on multiple physical computer systems. In yet other cases, multiple logical servers may be executed on the same physical computer system. Still further, a cluster of servers (e.g. 101) may be run on one or many different physical computer systems. Thus, the cluster of servers may include substantially any number of physical or logical servers, configured to perform any of a wide variety of tasks. For instance, server 102 includes various different modules for performing a variety of different functions. These functions will be explained in greater detail below.

Terminology which will be used throughout the document will be defined herein as follows: a "service level objective" (SLO) is the overall operational contract provided to a software application by the cluster management computer system. A "SLO service dimension" is an aspect of the overall operational contract for an application. One example is resource usage. The operational contract specifies guarantees (or SLOs) that are to be provided when a software application is provisioned and/or executed at runtime. At least in some cases, the scope of a service dimension is limited to the category it encompasses. For example, resource usage may deal with consumption of all kinds of resources (e.g. CPU, memory, network bandwidth, disk I/O, etc.). The terms "provisioning" or "deploying" an application refer to the process of instantiating an application in a cluster. During this time, the application may not be accessible by end-users or other clients. "Run-time" refers to a state after the application has been provisioned/deployed when the application is able to process requests on behalf of end-users or other clients.

A "dimension property" is an aspect of a SLO service dimension such as CPU capacity in the case of resource usage. A "dimension setting" is a container for dimension properties with one or more predefined values. For example, a dimension setting 111C may be a label such as "high" which identifies the property values for a dimension. In such cases, the high setting for the resource usage dimension might map to 10% processor, 4 GB memory, and 100 input/output operations per second (IOPS). Some property values for a dimension may be set independently of the setting choice. For example, the resource usage dimension may have a property which controls whether the resource cap is hard or soft. In this example, if the resource usage setting for an SLO is "high", then the resource cap is not predetermined and can either be set to hard or soft.

Examples of SLO service dimensions include the following: resource usage, geo-availability, security and compliance, point-in-time recovery and stock keeping unit (SKU). Each of these SLO service dimensions will be discussed briefly below. The resource usage dimension guarantees an application a fixed amount of resource capacity across measures affecting its performance. In practice, the guarantee may be statistical in order to support multiple different applications sharing the same underlying hardware resources on a single node in the cluster. Resource measures include: CPU utilization, memory size, disk space, disk IO bandwidth and network IO bandwidth. The capacity limits for each resource measure are configurable settings of this SLO dimension. Hard and soft caps for these limits are also configurable.

The capability provided by the geo-availability dimension protects an application from a disaster in a cluster by creating a replica of the application in a trusted cluster possibly located in a different geographic location. The recovery point objective (RPO) of the application in the trusted cluster is a configurable setting of this SLO dimension. The particular trusted cluster on which to create the replica and target SLO of the replica is also configurable.

The capability provided by the security and compliance dimension guarantees that an application adheres to specific security and auditing requirements. Examples of requirements include the type of authentication principal (such as operating system authentication or database authentication), password policy (such as password expiration period), and data encryption mode (such as key strength). The scope of the audit could include schema and specially tagged data. The retention period of the audit log is a configurable setting of this SLO dimension.

The capability provided by the point-in-time recovery dimension allows an application administrator to restore a database application in the cluster to a specific point in time in the past. For example, in cases where the app admin updates a database in error, the database can be rolled back to a desired state. The time span over which the restore can occur is a configurable setting of this SLO dimension.

The SKU dimension identifies the service edition provided to the application such as "Web" or "Business" in some types of databases. The SKU may bear a relationship with particular properties specified by other service dimensions. Any conflict of values across dimension properties and/or conflict of settings across service dimensions is prevented by the SLO model. For example, if the business model or an engineering limitation does not allow SKU "A" to provide geo-availability data protection, then the SLO model can incorporate a rule so that it is not possible for a SLO to be created where the SLO SKU setting is "A" and the SLO geo-availability setting is any value other than "None".

In some embodiments, SLO service dimensions and properties are defined internally by the SLO meta-data schema and cannot be modified by other users. For a given dimension, a "cluster administrator" may be able to create new settings as well as map existing settings to different property values subject to constraints imposed by the SLO metadata schema. Changes made by the cluster administrator to SLO meta-data (e.g., SLO settings) may be persisted in a cluster configuration data store. In some cases, changes implemented by a cluster administrator (e.g. setting changes) may be synchronized to each logical server in a particular cluster. This may be carried out using a background synchronization task run by the cluster management system which periodically checks the cluster configuration data store for changes to SLO meta-data initiated by the cluster administrator. If changes are detected, the synchronization task may apply the changes to each of the logical servers and impacted applications.

This may occur, for example, if a setting of the resource usage dimension was edited to change the resource reservation value for that setting. This setting could be used in different SLO's in various logical servers and assigned to various applications. The synchronization task first updates the metadata of each logical server in the cluster and then updates the SLO configuration for applications in the server that are assigned to an SLO containing the modified setting. Since, at least in some cases, a loosely coupled distributed system is implemented, this metadata will eventually be synchronized to all of the logical servers and applications of the cluster. Moreover, it will be understood that if these settings are used by the SLO for an existing application, then the SLO for the application is also updated in the synchronization.

The cluster administrator can also create out-of-the-box SLOs called SLO templates that can be used by server administrators or app administrators with little to no configuration. A "server administrator" may be able to create a new SLO by selecting a pre-defined setting for each SLO dimension, as well as specifying values of configurable properties. In some cases, the server administrator may have limited ability to update or delete a SLO once the SLO becomes associated with an application in the deployment. For instance, the cluster administrator for a given cluster may specify the extent to which the server administrator has permission to modify SLOs that are in use by applications. For example, in a private cloud scenario, the organization may or may not want to grant a server administrator this kind of permission. Controlling administrator rights in this manner could be orchestrated by the cluster admin of the private cloud cluster. An "application administrator" may be able to select an SLO for applications they are in charge of. The application administrator may not have permission to perform create, read, update or delete (CRUD) operations for a SLO (or may have limited rights, based on which SLO is in use). This separation of duties between the cluster administrator, server administrator, and application administrator may be formalized programmatically via role based authorization.

The cluster 101 may provide a small number (e.g. 3-5) of pre-defined SLOs "out-of-the-box" (OOB) as working examples which can be used to streamline configuration steps by the server administrator. These OOB SLOs may be available for each logical server in the cluster. SLO settings for each dimension are also provided OOB to help cluster administrators streamline configuring the settings exposed to the server administrator during SLO creation. In this manner, specifically designed defaults for the OOB SLOs may require very little if any changes in order to be usable in customer scenarios. It should also be noted that at least some of the OOB SLOs may be system SLOs that can only be applied to system applications (e.g. system database such as master database). The system application gets this SLO assigned as part of logical server provisioning. The cluster administrator controls whether an SLO is a usable as system SLO, user SLO, or both.

During deployment of an application (e.g., user database) into the cluster 101, the application administrator can accept the default SLO, or select another SLO from among the set of SLOs that have been enabled by the server administrator. The SLO application provisioning system then configures the SLO for the application in the cluster. Subsequent to application deployment, the application administrator is free to change an application SLO or enable automation to change the SLO based on a schedule or rules expressing business objectives and/or rules evaluating monitored data. Applications deployed in the cloud prior to the release of SLO functionality are automatically assigned the default SLO of the logical server. Logical servers include a default user SLO. The server administrator has permission to change the default user SLO of the logical server to a different user SLO that is also contained within the same logical server.

After the application is deployed into the cluster, the monitoring module 128 detects if the SLO for an application becomes misconfigured or if the operational guarantees specified by the SLO are not satisfied. If an SLO compliance violation is detected, then a health model for the application is updated and the server or application administrator is alerted. The health model may then determine if corrective actions need to be performed automatically by the system in order to restore SLO compliance. If correction actions fail or cannot be performed within some period of time as set by the cluster administrator, then the health model for the cluster is updated, and the cluster administrator is alerted.

During failover of a cluster due to disaster recovery or migration of applications between private and public clouds, the target cluster and source cluster may not have the same SLOs by design. For example, auditing conditions as expressed in SLO may need to be different across geo-locales based on regulatory requirements. Or, in other cases, hardware and capacity across clusters may differ and necessitate providing different SLO settings for the resource usage dimension. The cluster management system supports transitioning the SLO for an application in each of these scenarios.

For example, the cluster management system may automatically assign the application to the default SLO in the target logical server of the target cluster. In another example, the SLO of the application in the source logical server may identify the target SLO in the target logical server. In this case, if the application is provisioned in the target server, then the cluster management system can automatically assign the application to the target SLO.

For transparent scale-out (TSO) sharded applications and user controlled sharded applications, the resource usage dimension for an SLO involves resource allocation for each of the application shards. The application shards may be provisioned by the cluster management system across multiple nodes in the cluster.

In the case of TSO sharded applications, the resource usage setting is identical across shards since the resource demand due to the application workload is automatically and evenly distributed across each shard. Moreover, at least in some cases, there may be no difference in the user experience of SLO selection during TSO application deployment relative to deployment of a non-sharded application. The SLO selected by the application administrator for the TSO application is automatically applied by the cluster management system to all the shards forming the TSO application.

In the case of user controlled sharded applications, the SLO resource usage setting may be different across shards since the application developer may introduce non-trivial resource usage imbalances across shards. In this case, the application administrator may select different SLOs for different shards. Alternatively, the application administrator may decide to select a SLO just for the root of the sharded application, and allow the cluster management system to automatically apply this same SLO to each of the shards associated with this root. This alternative is considerably simpler for the application administrator especially in cases where the number of shards is large (e.g., order of $10^5$ shards).

In some cases, the creation of new SLOs or changes to existing SLOs can impact the physical server provisioning requirements of the cluster. For instance, the capacity of the cluster may need to be resized if the cluster admin increases the number of reserved compute units for an SLO setting in the resource usage dimension. Or, if the data retention period of the audit log for the security and compliance dimension is increased from one to two years, the capacity of the cluster may also need to be resized. In such cases, the cluster management system can estimate the impact of proposed SLO changes and provide mitigation guidance to the cluster and server administrators.

The resource usage dimension may also reserve a fixed amount of hardware capacity for each deployed application. Application administrators risk choosing an SLO that provides either too little or too much capacity, especially for applications that exhibit non-trivial time dependent utilization patterns. In some cases, an improper choice of SLO may cause poor application performance, incur unnecessary monetary charges to customers, or lead to an under-utilized cluster depending on whether the SLO resource usage setting is under- or over-sized. There are several possible mitigations that involve tuning the resource reservation parameterization of an SLO as a function of workload demand over time. Other mitigations may involve over-provisioning applications on a given node with the expectation that not all applications will simultaneously require all of the capacity specified in their SLO. The above concepts will be explained further below with regard to methods 200, 300 and 400 of FIGS. 2, 3 and 4, respectively.

Figure 2:
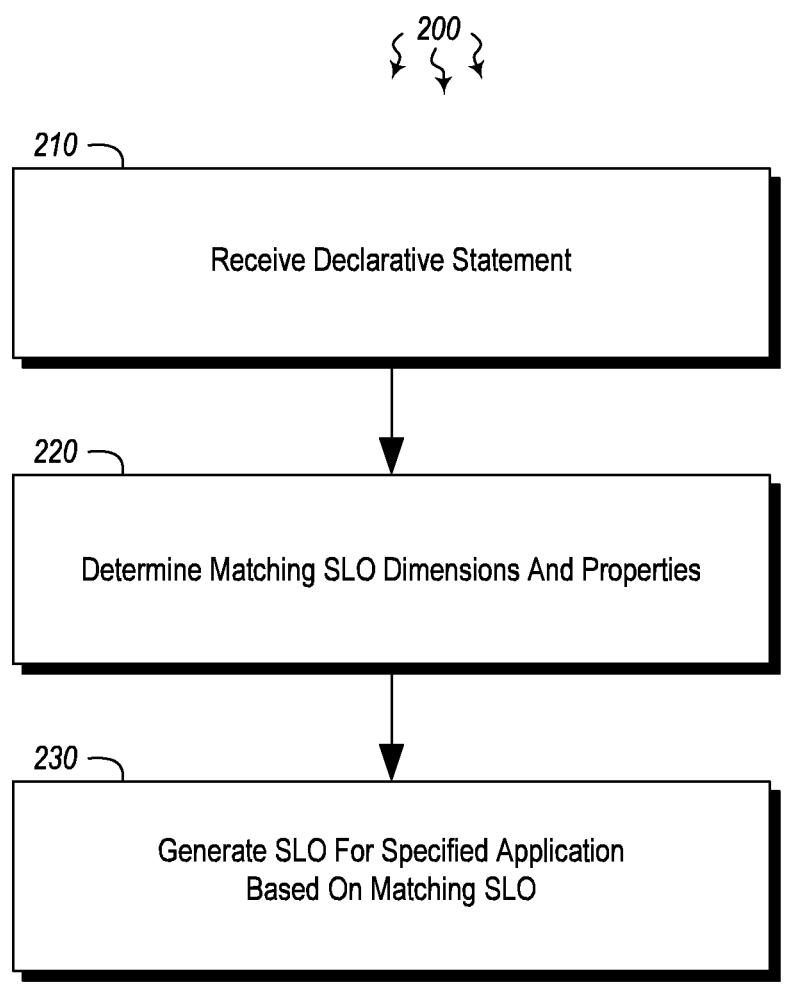
FIG. 2 illustrates a flowchart of an example method for declaratively managing software applications using role-based administrative boundaries.
Figure 3:
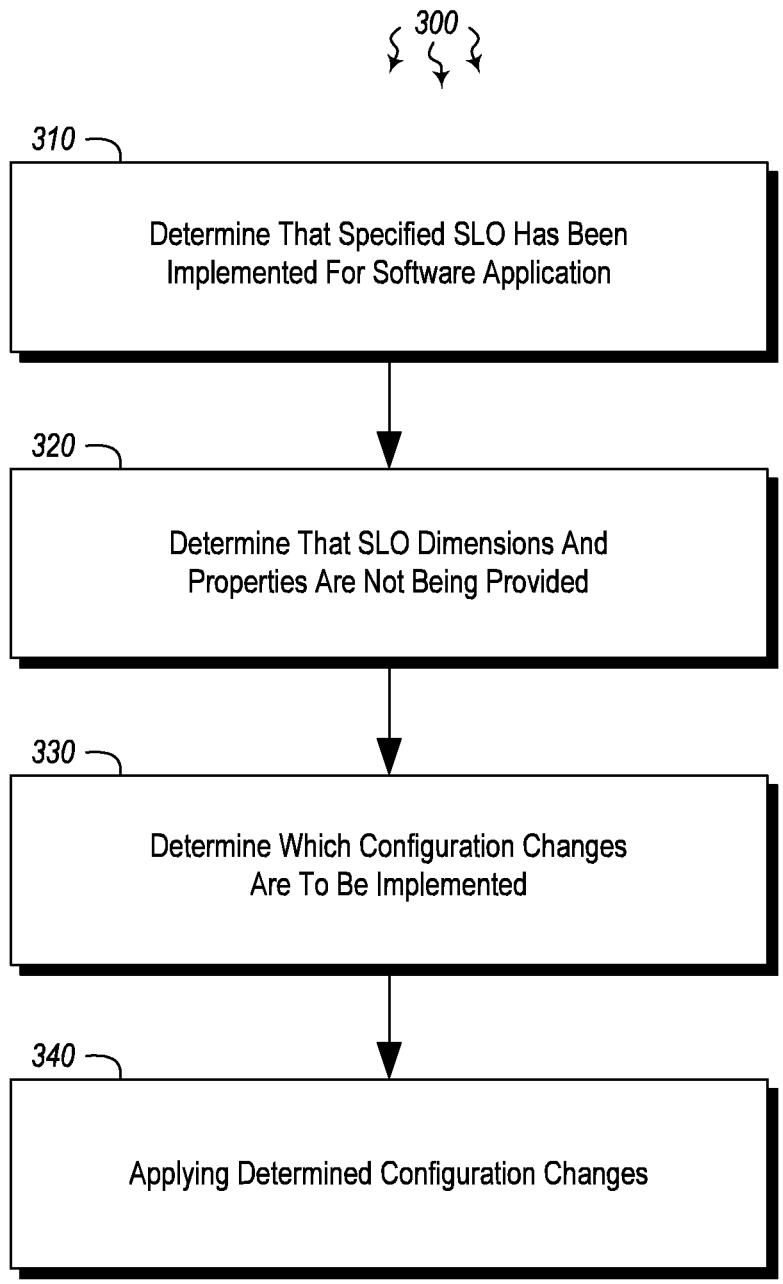
FIG. 3 illustrates a flowchart of an example method for dynamically applying a service level objective (SLO) to a specified software application.
Figure 4:
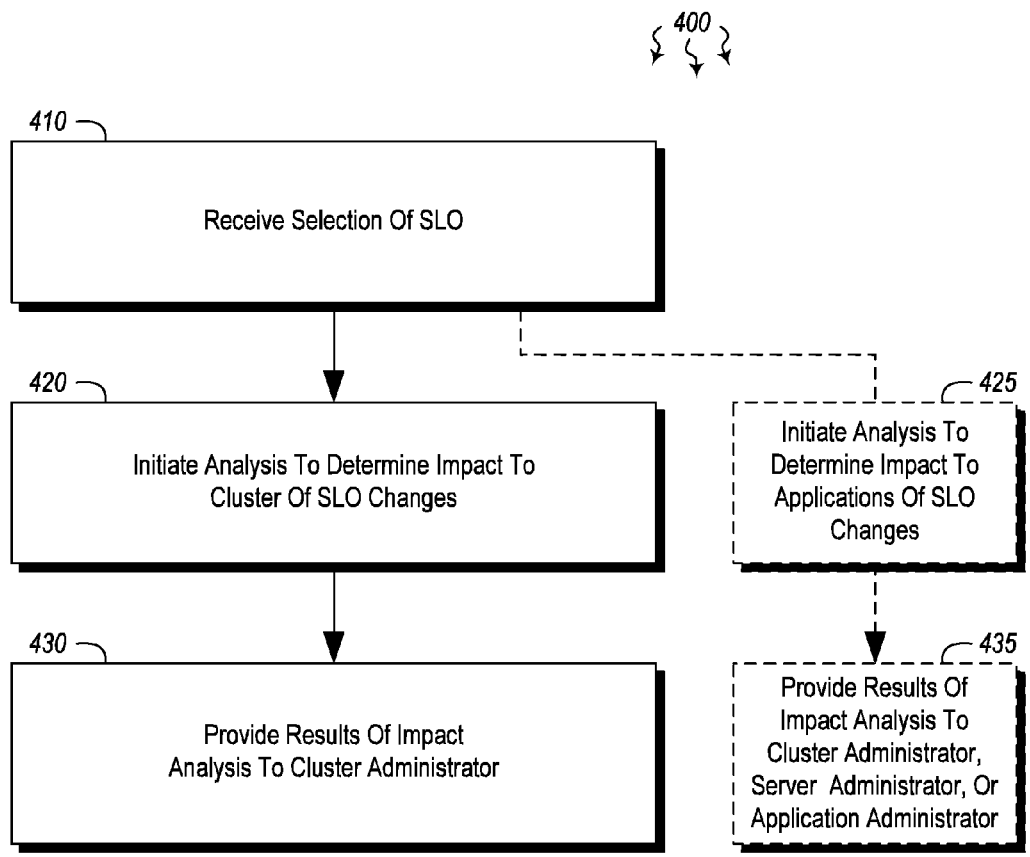
FIG. 4 illustrates a flowchart of an example method for efficiently performing an impact analysis for a specified service level agreement SLO.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for declaratively managing software applications. The method 200 will now be described with frequent reference to the components and data of environment 100.

Method 200 includes an act of receiving at least one declarative statement from a cloud service user, the declarative statement indicating one or more operational requirements that are to be applied during the provisioning and/or the runtime execution of a specified software application (act 210). For example, cluster management system 102 may receive declarative statement 108 from an administrative user (e.g. cluster administrator 105, server administrator 106 or application administrator 107) or from some other type of cloud service user. The declarative statement may be any type of indication that states operational guarantees that are to be applied during the provisioning and/or the runtime execution of a software application (e.g. user application 141).

These operational guarantees may include a parameterization of resource capacity requirements for an application such as the processor capacity, memory capacity, network bandwidth, or disk I/O bandwidth which is necessary for the desired functioning of an application; or other operational guarantees. The operational guarantees may also include recovery point objective (RPO) parameters. For instance, the RPO parameters may be used to protect an application from disaster in a cluster by creating a database replica in a trusted cluster. This trusted cluster may be located in a different geographic location so as to provide data redundancy. Operational guarantees may further include point-in-time recoverability guarantees as well as security and compliance guarantees. Indeed, it should be noted that substantially any type of operational guarantees may be designed and implemented in the systems described herein.

In some cases, the operational guarantees may be specified in a declarative manner. As such, the operational guarantees do not need to be procedurally specified in a manner requiring an understanding of implementation details of the cluster, but rather declared in a manner that indicates broadly indicates what is to occur during the provisioning and/or the runtime execution and be maintained during the runtime of a given application.

Method 200 also includes an act of determining which service level objective (SLO) service dimensions and dimension properties match the operational requirements specified in the declarative statement, each SLO defining one or more SLO service dimensions and dimension properties that are intended to be provided during the provisioning and/or the runtime execution of the specified application (act 220). For example, match determining module 110 of cluster management system 102 may determine which of a plurality of existing SLO service dimensions and dimension properties match the declaratively indicated operational requirements. As indicated above, SLO service dimensions include aspects of an overall operational contract that governs the provisioning and/or runtime execution of an application. SLO dimension properties are aspects of an SLO dimension. For example, resource usage may be an SLO service dimension and CPU capacity may be an SLO property of that dimension.

The SLO service dimensions may include any one or more of the following: software application resource usage, software application geo-availability, software application recoverability, software application security, software application auditing, and software application performance such as request latencies of the application. Many other service dimensions are possible, and this list is not intended to be limiting. Each SLO service dimension may include SLO setting properties that are to be followed when the application (e.g. user application 141) is provisioned and/or when the application is executed at runtime. For instance, resource usage may include CPU requirements and memory size requirements, application geo-availability may specify the recovery point objective (RPO), SLO in the target cluster after a cluster failover event, countries, states, time-zones, interoffice boundaries in which the application is or is not to be deployed, application recoverability may include data backup requirements (hourly, daily, weekly, etc.). Software application security may include operating system, hardware, application version or other software application security requirements and software application auditing and software application performance such as request latencies of the application may each further specify settings related thereto.

It will be understood that each of the examples provided above are merely to assist the reader in understanding the broad range of different types of settings that are possible. Each SLO dimension 111A may have multiple SLO service dimension properties and settings. Each may be configurable (or not configurable) based on the SLO dimension setting 111C or other dimension property 111B and which user is attempting to establish or change the SLO dimension setting or other dimension property. In some cases, role-based policies may be implemented to control which administrative users have access to which SLO service dimensions, properties and settings. As such, an administrative user that has appropriate administrative privileges can specify which of a plurality of available SLOs is to be used for the specified software application. Once specified, that SLO will be used in the provisioning and/or runtime execution of the associated application until changed by the administrator.

Method 200 further includes an act of generating an SLO for the specified application based on the determined SLO service dimensions and dimension properties that matched the operational requirements specified in the declarative statement (act 230). Thus, after an administrative user has declaratively specified operational requirements 109 for deployment of application 141, and after the match determining module 110 has matched SLO service dimensions and properties to the declaratively specified operational requirements, the SLO generating module 115 may generate SLO 117 with its corresponding service dimensions 111A and dimension properties 111B. The generated SLO thus includes the declaratively specified operational requirements that are to be implemented when deploying and/or running the software application 141.

The generated SLO 117 may then be associated with the specified software application. An application administrator may make the association, indicating that the generated SLO 117 is to be applied to a specified software application. The association ensures that when the application is deployed to the one or more end users 130, the generated SLO is applied and the application is deployed according to the service dimensions 111A and dimension properties 111B of the generated SLO, which is in turn based on the declaratively specified operational requirements and any other property values of the SLO. The generated SLO is continuously applied by the computer system to the specified software application during the run-time of the application.

Figure 5:
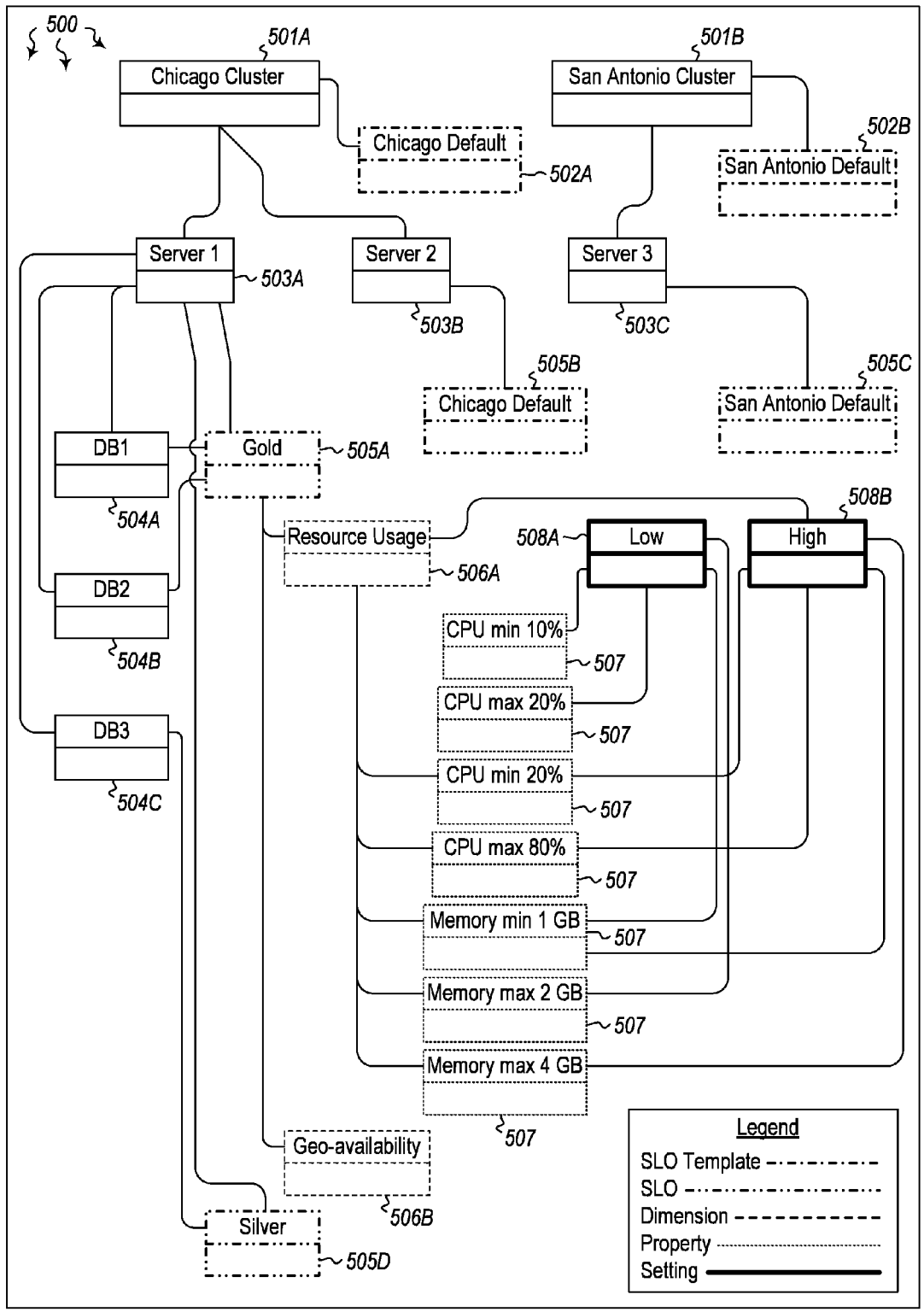
FIG. 5 illustrates an embodiment of the present invention in which SLO service dimensions and dimension properties are applied to applications.

FIG. 5 illustrates an application provisioning environment 500 in which various database applications, servers, server clusters and SLOs are shown. The environment includes two clusters (Chicago (501A) and San Antonio (501B)). Each cluster contains Out-Of-Box SLO templates including the default template (502A and 502B, respectively). The SLO templates are deep copied into any new server that is created by a server administrator. The SLO specifies the SLO dimension setting values 111C and SLO dimension property values 111B which are applied during application deployment and maintained during the application runtime. The Chicago cluster includes server 1 (503A) and server 2 (503B). Server 1 provides a Silver SLO (505D) and a "Gold" (505A) SLO. The Gold SLO may indicate that applications hosted on server 1 using this SLO are to be given a large amount of processing and other resources. The Gold SLO may, for instance, indicate that SLO dimension "resource usage" 506A is to be provided using one or more SLO dimension properties 507 (e.g. CPU min 20%, CPU max 80%, memory min 1 GB, memory max 4 GB). Each SLO property 507 may also be governed by an associated setting. For instance, the "Low" setting 508A may automatically apply some of the lower-level SLO properties such as CPU min 10% and memory max 2 GB, while the "High" setting 508B may apply some of the higher-level SLO properties such as CPU min 20% and memory max 4 GB.

As shown in environment 500, the Gold SLO also includes a "Geo-availability" SLO dimension (506B) that defines availability settings for the application. In some cases, different databases used by server 1 can be governed by different SLOs. As can be seen in environment 500, applications DB1 (504A) and DB2 (504B) are provisioned and/or executed at runtime according to the "Gold" SLO (505A), while applications DB3 (504C) are provisioned and/or executed at runtime according to the "Silver" SLO (505D). SLO templates are deep copied from the cluster configuration store into any new logical server created by a server administrator. For example, server 2 (503B) after its creation includes the "Chicago Default" SLO template 505B, while server 3 (503C) after its creation includes the "San Antonio Default" SLO template 505C. The server administrator may then customize these templates and the changes will only be applied within the context of the logical server. This application provisioning environment is just one of many possible environments. The number and type of each element shown may be configured by an appropriate-level administrator in different deployments and other embodiments.

In some cases, each dimension and/or dimension property (i.e. each provisioning and/or runtime execution guarantee) may be continuously monitored to ensure that the guarantees are being provided for the specified software application. In some cases, the monitoring may determine that one or more of the SLO guarantees has been violated during the run-time of the software application 141. Upon determining that at least one of the SLO guarantees has been violated, the cluster management system continually attempts to re-satisfy the SLO guarantees by making whatever changes are necessary regarding resource usage, geo-availability, etc. For example, if an application is not provided with the resource reservation guaranteed by its SLO because of resource capacity constraints of the physical host, then the system may automatically reposition the application to a physical host with sufficient capacity.

As mentioned above, management of software application deployment using SLOs may be based on one or more administrative roles, where each role has access to and configures different SLO application deployment policy settings. The cluster administrator may be able to create new settings as well as map existing settings to different property values subject to constraints imposed by the SLO application provisioning system. The cluster administrator can also create out-of-the-box SLOs that can be applied with little to no configuration.

The server administrator may be able to create a new SLO by selecting a pre-defined setting for each SLO dimension, as well as specifying values of configurable properties. In some cases, the server administrator may have limited ability to update or delete a SLO once the SLO becomes associated with an application in the deployment. The application administrator may be able to select an SLO for applications they are in charge of. The application administrator may not have permission to perform SLO CRUD (create/read/update/delete) operations. In some embodiments, a workflow may be provided for the administrative roles, where the workflow allows the various types of administrators to change operational requirements of the specified software application using an SLO. The workflow may show where and how the SLO is to be applied to ensure each application is provisioned and/or executed at runtime according to the appropriate SLO. SLOs may be dynamically applied to software applications, as shown in FIG. 3 below.

The workflow may further allow administrators to make SLO assignments to applications. The SLO is first drafted, then enabled, disabled or deleted. Different rules may apply as to when an SLO may be edited, applied or deleted. Furthermore, workflows may be used to control who, how and when an SLO can be edited, applied or deleted. Each SLO or SLO template may thus be controlled by a state machine that applies rules according to the state the SLO or SLO template is currently in. The rules for SLO modification may be specified by a cluster administrator, and may be applied to SLOs individually or to groups of SLOs (such as, for example, SLOs of a particular logical server or cluster).

As mentioned above, an SLO template (e.g. 502A) is created by a cluster administrator. The SLO template is persisted in a private store in the cluster (e.g. cluster 101) where it can be deep copied into one or more logical servers automatically as they are created (e.g. logical servers 103 and 104). Once the SLO template is copied into a logical server, then the copy of the SLO template is referred to as an SLO. At this point, the server administrator may perform CRUD operations on the SLO in the logical server if the SLO is not a system SLO (as system SLOs are reserved for system applications). These CRUD operations do not impact the cluster-wide SLO template from where the SLO originates nor do such operations impact the SLOs in other logical servers.

Assigning an SLO to an application may occur in a variety of ways. For example, a SLO may be assigned to an application by an application administrator. The application administrator may select a SLO and apply it to one or more of the applications under his or her control (such as for a user application 141). In another embodiment, a server administrator assigns an SLO for a group of applications residing on his or her logical server (e.g. 103). In still another embodiment, a cluster administrator may assign an SLO to one or more applications in his or her control. In the case of system applications, the cluster management system 102 can assign the system SLO automatically to each system application (e.g. such as for the system application 140 of logical server 103).

FIG. 3 illustrates a flowchart of a method 300 for dynamically applying configuration changes to a specified software application based on a service level objective (SLO). The method 300 will now be described with frequent reference to the components and data of environment 100.

Method 300 includes an act of determining that an SLO has been applied to a specified software application by an application-level administrator, the SLO indicating one or more SLO service dimensions and dimension properties that are to be provided during the provisioning and/or the runtime execution of the specified application (act 310). For example, SLO 117 may have been applied to the deployment of software application 141, as specified by application administrator 107. The SLO indicates various SLO service dimensions 111A and dimension properties 111B that are to be provided while the application is being provisioned by application provisioning module 119. The SLO application provisioning system may determine that at least one of the SLO service dimensions and/or dimension properties that were to be provided during the provisioning and/or the runtime execution of the specified application is currently not being provided (act 320). The SLO application provisioning system may monitor the provisioning and/or runtime execution of the application to ensure that the appropriate SLO service dimensions and dimension properties are being satisfied during the application's deployment and/or runtime.

Once it has been determined that SLO for an application is not satisfied (e.g. due to a lack of computing resources, etc.), the SLO application provisioning system determines which configuration changes are to be implemented to satisfy the SLO for the specified application (act 330). Then, based on the determination of which configuration changes are to be made, the configuration change applying module 120 of cluster management system 102 applies the determined configuration changes (act 340). Applying the changes ensures that the application is provisioned and/or executed at runtime according to the SLO service dimensions and dimension properties specified in the SLO.

The cluster management system may perform self-healing by automatically applying the determined configuration changes. Accordingly, whenever monitoring indicates that one or more SLO service dimensions or dimension properties for one or more applications are no longer being satisfied by the cluster management system, the SLO application provisioning module may automatically determine which changes are needed to bring the configuration of the application back into compliance with the declarative intent specified by the SLO and dynamically apply those changes. In some cases, changes may be applied by module 120 to optimize deployment of the specified software application among a plurality of computer systems. In still other cases, the SLO may incorporate scheduled operational requirements. Thus, for example, an application like a market place might want to reserve a larger amount of resources for holidays or other high-volume shopping days. That same application, however, might use a moderate amount of resources the rest of the time. The SLO may incorporate such operational requirements by modifying the reservations accordingly based on the input schedules.

For instance, the SLO application provisioning system may optimize deployment by determining which computing resources are available and, based on which resources are available, by distributing processing load among the plurality of computer systems based on each system's processing availability. Thus, if one server computer system (or a set of server computer systems) in cluster 101 has more processing capacity (or more of another resource), deployment of the application may be transitioned to those servers that are (at least currently) best able to handle the load. As resources change, application deployment may similarly change to ensure that those systems best able to process the load are doing so.

Turning now to FIG. 4, method 400 is provided for efficiently performing an impact analysis for a specified SLO. The method 400 will now be described with frequent reference to the components and data of environment 100.

Method 400 includes an act of receiving an indication from a user that a specified SLO is to be applied to one or more applications, the SLO indicating one or more SLO service dimensions and dimension properties that are to be applied to the applications (act 410). The impact analysis module 125 of cluster management system 102 may then initiate an impact analysis to determine the potential effects to the cluster of hosting the specified applications according to the SLO service dimensions and dimension properties indicated in the specified SLO (act 420). For example, returning to the environment of 500, if an administrator wanted to know the potential impact of applying the "Gold" SLO (505A) to the application DB3 (504C), the impact analysis module could analyze the processing, storage, network bandwidth and other potential effects to the cluster (e.g. 101) of applying the "Gold" SLO on application DB3.

Then, the impact analysis module can provide the results 127 of the impact analysis to one or more administrative users (105, 106 and/or 107). The results 127 indicate the potential effects to the cluster of hosting the specified applications according to the SLO service dimensions and dimension properties indicated in the specified SLO (act 430). In some cases, a historical analysis of application usage patterns may be performed and used to determine the potential effects of applying a specified SLO. The application usage patterns may thus be used to recommend an optimal SLO configuration. Impact analyses that determine potential impact to a cluster are typically sent to a cluster administrator, while impact analyses that determine potential impact to an application may be sent to cluster administrators, server administrators, or application administrators (435).

In some cases, the impact analysis may further provide an estimated impact to revenue generated from cloud tenants for a specified application with specified SLO and billing model where the billing model associates a price with the SLO. Thus, the impact analysis could show a potential client or current cloud user the change in monetary cost by switching to a different SLO. Then, based on the client's stated desires, the SLOs governing provisioning and/or runtime execution of their applications could be updated to reflect the desired changes. Computer system processing capacity and other resources can be dynamically reallocated according to the results of the impact analysis.

In some embodiments where an impact analysis is used, a resource usage dimension may reserve a fixed amount of hardware capacity for each deployed application. Application administrators may risk choosing an SLO that provides either too little or too much capacity, especially for applications that exhibit non-trivial time dependent utilization patterns. This can cause poor application performance, incur unnecessary monetary charges to customers, or lead to an under-utilized cluster depending on whether the SLO resource usage setting is under- or over-sized. There are several possible mitigations that involve tuning the resource reservation parameterization of an SLO as a function of workload demand over time. Other mitigations involve over-provisioning applications on a given node with the expectation that not all applications will simultaneously require all of the capacity specified in their SLO.

It should be noted that tuning the resource reservation parameterization as described above may be taken one step further to tune the resource reservation parameterization using historical performance metrics gathered for the application in order to achieve an operational objective that satisfies request latency goals for the application.

An impact analysis may also be used to determine the impact to a particular cluster of administrative users assigning a particular SLO to any number of deployed apps. In such cases, an impact analysis may be initiated based on a change in SLO (optional act 425). For example, suppose a new SLO is introduced by the cluster administrator which provides a high level of resource capacity to an application. The impact analysis would then determine the impact to cluster resource utilization if this SLO were subsequently assigned to some specified number of applications by one or more users. Or, the cluster administrator may use the impact analysis to determine how many applications using the new SLO would it take to cause the cluster to run out of resource capacity (which would interfere with the normal operation of the cloud service). As such, impact analyses can be used in a variety of different manners, and the above examples should not be read as limiting.

In another example, SLO impact analyses may be performed to determine project monetary costs to applying an SLO. For instance, a user of services provided by the cluster 101 may wish to determine the anticipated change in their bill due to changing an SLO for a specified application or group of applications. From another perspective, a cloud services provider may wish to understand the change in revenue and operating costs due to one or more tenants changing the SLO for any number of their applications. For instance, a cloud provider may provide an "Extra Large" SLO setting for the resource usage dimension that provides a proportionally large amount of computing resources to applications using that SLO. The impact analysis would indicate that an SLO created with this "Extra Large" setting would incur a charge of some amount of dollars per hour (or other unit) of usage per application for the cloud user, and would require a certain number of processor cores and a certain amount of memory per application. This information can be provided on a application-by-application basis.

The cloud user could also use an impact analysis to determine how much it would cost to, for example, assign DB1 and DB3 to a new SLO which specifies the "Extra Large" setting. The cloud provider can use an impact analysis to determine what would happen, for example, if 50% of all databases in the Chicago cluster at some future time (e.g. six months from now) were to use an SLO with the "Extra Large" setting—what would be the resulting change in the revenue generated and what would be the additional cost (since more physical hardware capacity would be required). As can be appreciated, impact analyses can be used by both cloud users and cloud providers to determine how application of SLOs can affect resource usage and the anticipated costs for that resource usage.

Accordingly, as described above, methods, systems and computer program products are provided which can be used to declaratively manage software applications. Moreover, methods, systems and computer program products are provided which dynamically apply a service level objective to specified software applications and efficiently perform impact analyses for specified service level objectives.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, cause the computing system to perform a method for declaratively managing software applications using role-based administrative boundaries, the method comprising the following:
an act of receiving at least one declarative statement, the declarative statement indicating one or more operational requirements that are to be applied during at least one of the provisioning and the runtime execution of a specified software application;
an act of determining which service level objective (SLO) service dimensions and dimension properties match the operational requirements specified in the declarative statement, each SLO defining one or more SLO service dimensions and dimension properties that are intended to be provided during at least one of the provisioning and the runtime execution of the specified application; and
an act of generating an SLO for the specified application based on the determined SLO service dimensions and dimension properties that matched the operational requirements specified in the declarative statement.

2. The computer system of claim 1, further comprising:
an act of receiving an indication from an application administrator indicating the generated SLO is to be applied to the specified software application; and
an act of applying the generated SLO to the specified software application.

3. The computer system of claim 1, wherein the SLO service dimensions include one or more of the following: software application resource usage, software application geo-availability, software application recoverability, software application security, software application auditing, and software application performance such as request latencies of the application.

4. The computer system of claim 1, wherein an administrative user specifies which of a plurality of available SLOs is to be used for the specified software application or group of applications.

5. The computer system of claim 1, wherein the generated SLO is continuously applied by the computer system to the specified software application during the run-time of the application.

6. The computer system of claim 5, wherein the computer system monitors one or more SLO guarantees that are to be provided for the specified software application.

7. The computer system of claim 6, wherein the monitoring determines that one or more of the SLO guarantees has been violated during deployment of the specified software application; and
upon determining that one or more of the SLO guarantees has been violated, the computer system continually attempts to re-satisfy the SLO guarantees until successful.

8. A computer system comprising the following:
one or more processors;
system memory;
one or more computer-readable storage media having stored thereon computer-executable instructions that, when executed by the one or more processors, cause the computing system to perform a method for dynamically applying configuration changes to a specified software application based on a service level objective (SLO), the method comprising the following:
an act of determining that an SLO has been applied to a specified software application, the SLO indicating one or more SLO service dimensions and dimension properties that are to be provided during at least one of the provisioning and the runtime execution of the specified application;
an act of determining that at least one of the SLO service dimensions and dimension properties that were to be provided during at least one of the provisioning and runtime execution of the specified application is currently not being provided;
an act of determining which configuration changes are to be implemented to satisfy the SLO service dimensions and dimension properties for the specified application; and
based on the determination of which configuration changes are to be made, an act of applying the determined configuration changes, such that the application is provisioned according to the SLO service dimensions and dimension properties specified in the SLO or operates during runtime according to the SLO service dimensions and dimension properties specified in the SLO.

9. The computer system of claim 8, wherein the host system may perform self-healing by automatically applying the determined configuration changes.

10. The computer system of claim 8, further comprising an act of dynamically updating the configuration for an application upon receiving an indication that the computer system is not in compliance with one or more of the SLO dimensions or dimension properties applied to the application.

11. The computer system of claim 8, further comprising optimizing deployment of the specified software application among a plurality of computer systems.

12. A computer system comprising the following:
one or more processors;
system memory;
one or more computer-readable storage media having stored thereon computer-executable instructions that, when executed by the one or more processors, cause the computing system to perform a method for efficiently performing an impact analysis for a specified service level objective (SLO), the method comprising the following:
an act of receiving an indication that a specified SLO is to be applied to one or more applications, the SLO indicating one or more SLO service dimensions and dimension properties that are to be applied to the applications;
an act of initiating an impact analysis to determine the potential effects to a cluster of hosting the specified applications according to the SLO service dimensions and dimension properties indicated in the specified SLO; and
an act of providing the results of the impact analysis to the user, the results indicating the potential effects to the cluster of hosting the specified applications according to the SLO service dimensions and dimension properties indicated in the specified SLO.

13. The computer system of claim 12, further comprising:
an act of performing a historical analysis of application usage patterns; and
an act of reallocating computer system processing capacity according to the impact analysis.

14. The computer system of claim 12, wherein the impact analysis further provides an estimated impact to revenue generated from cloud tenants for specified applications with specified SLOs and billing model where the billing model associates a price with the SLO.

15. The computer system of claim 12, wherein the impact analysis further describes the impact to at least one of an application's behavior and monetary cost for a cloud services user or group of users.

16. A computer program product for implementing a method for declaratively managing software applications using role-based administrative boundaries, the computer program product comprising one or more computer-readable storage media having stored thereon computer-executable instructions that, when executed by one or more processors of a computing system, cause the computing system to perform the method, the method comprising:
an act of receiving at least one declarative statement, the declarative statement indicating one or more operational requirements that are to be applied during at least one of the provisioning and the runtime execution of a specified software application;
an act of determining which service level objective (SLO) service dimensions and dimension properties match the operational requirements specified in the declarative statement, each SLO defining one or more SLO service dimensions and dimension properties that are intended to be provided during at least one of the provisioning and the runtime execution of the specified application; and
an act of generating an SLO for the specified application based on the determined SLO service dimensions and dimension properties that matched the operational requirements specified in the declarative statement.

17. The computer program product of claim 16, wherein management of software application deployment using SLOs is based on one or more administrative roles, where each role configures one or more SLO application deployment policy settings.

18. The computer program product of claim 17, wherein the administrative roles comprise at least one of the following: cluster administrator, server administrator and application administrator.

19. A computer program product for implementing a method for dynamically applying configuration changes to a specified software application based on a service level objective (SLO), the computer program product comprising one or more computer-readable storage media having stored thereon computer-executable instructions that, when executed by one or more processors of a computing system, cause the computing system to perform the method, the method comprising:
an act of determining that an SLO has been applied to a specified software application, the SLO indicating one or more SLO service dimensions and dimension properties that are to be provided during at least one of the provisioning and the runtime execution of the specified application;
an act of determining that at least one of the SLO service dimensions and dimension properties that were to be provided during at least one of the provisioning and runtime execution of the specified application is currently not being provided;
an act of determining which configuration changes are to be implemented to satisfy the SLO service dimensions and dimension properties for the specified application; and
based on the determination of which configuration changes are to be made, an act of applying the determined configuration changes, such that the application is provisioned according to the SLO service dimensions and dimension properties specified in the SLO or operates during runtime according to the SLO service dimensions and dimension properties specified in the SLO.

20. The computer program product of claim 19, wherein optimizing deployment of the specified software application comprises determining which computing resources are available and, distributing processing load among the plurality of computer systems based on each system's processing availability and in such a way that deployment constraints derived from the SLO of the application are satisfied.

21. The computer program product of claim 19, wherein the SLO implements one or more service dimensions or dimension properties based on a predetermined schedule.

22. A computer program product for implementing a method for efficiently performing an impact analysis for a specified service level objective (SLO), the computer program product comprising one or more computer-readable storage media having stored thereon computer-executable instructions that, when executed by one or more processors of a computing system, cause the computing system to perform the method, the method comprising:
an act of receiving an indication that a specified SLO is to be applied to one or more applications, the SLO indicating one or more SLO service dimensions and dimension properties that are to be applied to the applications;
an act of initiating an impact analysis to determine the potential effects to a cluster of hosting the specified applications according to the SLO service dimensions and dimension properties indicated in the specified SLO; and
an act of providing the results of the impact analysis to the user, the results indicating the potential effects to the cluster of hosting the specified applications according to the SLO service dimensions and dimension properties indicated in the specified SLO.

23. The computer program product of claim 22, further comprising providing a workflow for the administrative roles, the workflow allowing the administrators to change operational requirements of the specified software application via an SLO.

* * * * *